Aug. 14, 1956   J. H. MURPHY ET AL   2,758,408
FISHING LURES

Filed Dec. 28, 1953   4 Sheets-Sheet 1

INVENTORS
John H. Murphy
William R. Anderson
BY *Lancaster, Allwine & Rommel*
ATTORNEYS.

INVENTORS
John H. Murphy
William R. Anderson

BY
ATTORNEYS

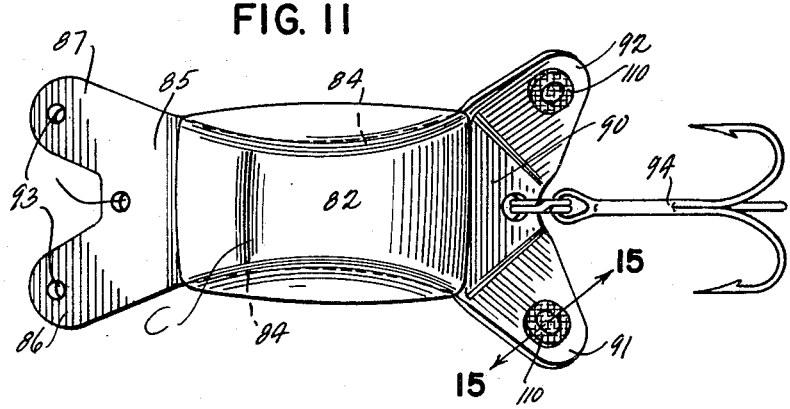
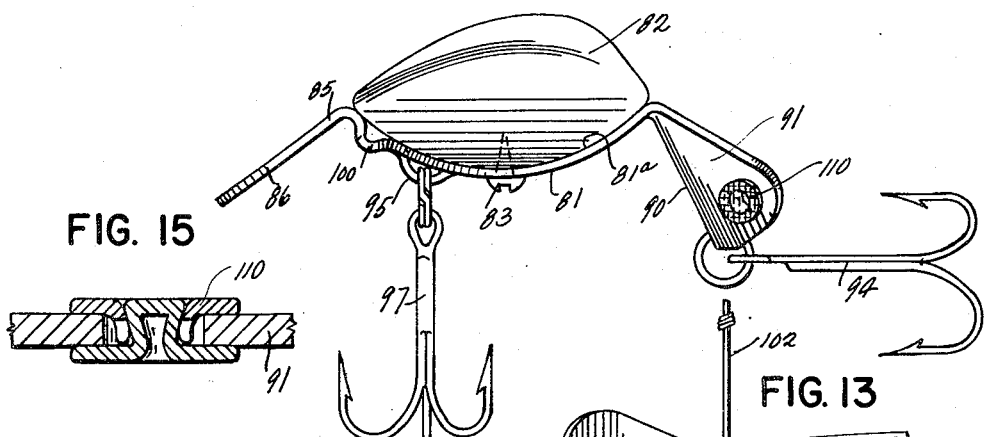
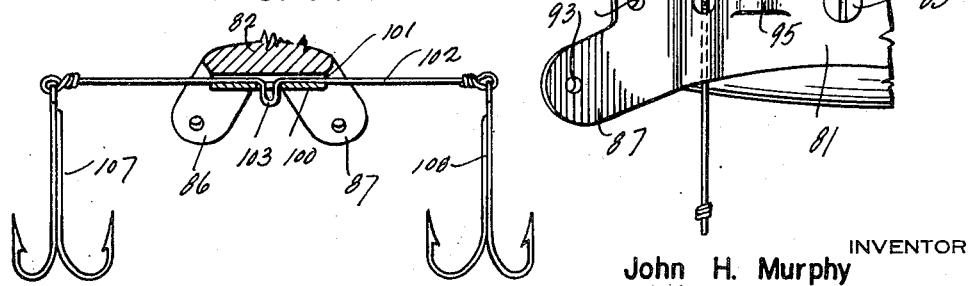

INVENTORS
John H. Murphy
William R. Anderson

United States Patent Office 2,758,408
Patented Aug. 14, 1956

2,758,408

FISHING LURES

John H. Murphy and William R. Anderson, Detroit, Mich.

Application December 28, 1953, Serial No. 400,470

7 Claims. (Cl. 43—42.09)

This invention relates to improvements in fishing lures.

The primary object of this invention is the provision of a fishing lure having improved means by which the lure can be made to spin upon a longitudinal axis and also to laterally wobble or wiggle.

A further object of this invention is the provision of improved fishing lures, constituting improvements over the fishing lures of our U. S. Patent 2,673,417, dated March 30, 1954, the improvements thereover including among others, the following features:

(A) An improved end deflecting blade and line attaching constructions.

(B) An improved float connection to a thin gauge base of the lure.

(C) Improved means for attraction of fish comprising removable flash buttons contrasting with the body of the lure.

(D) An improved gang hook construction.

(E) An improved easily removable and attachable plastic body construction.

Other objects and advantages of the invention will be apparent during the course of the following detailed description.

In the accompanying drawings, forming a part of this specification, and wherein similar reference characters designate corresponding parts throughout the several views:

Fig. 11 is a top plan view of an improved float type of lure embodying the end blade and line attaching finger constructions of the forms of the invention shown in Figs. 1 and 5.

Fig. 12 is a side elevation of the lure of Fig. 11.

Fig. 13 is a fragmentary bottom plan view of the gang hook attaching end of the lure of Figs. 11 and 12.

Fig. 14 is a transverse cross sectional view taken through the body of the lure shown in Figs. 11, 12 and 13, and more particularly showing the manner in which swinging gang hooks may be attached thereto.

Fig. 15 is a transverse cross sectional view of a flash button of the lure of Fig. 11, the view being taken substantially on the line 15—15 of Fig. 11.

Figure 1:
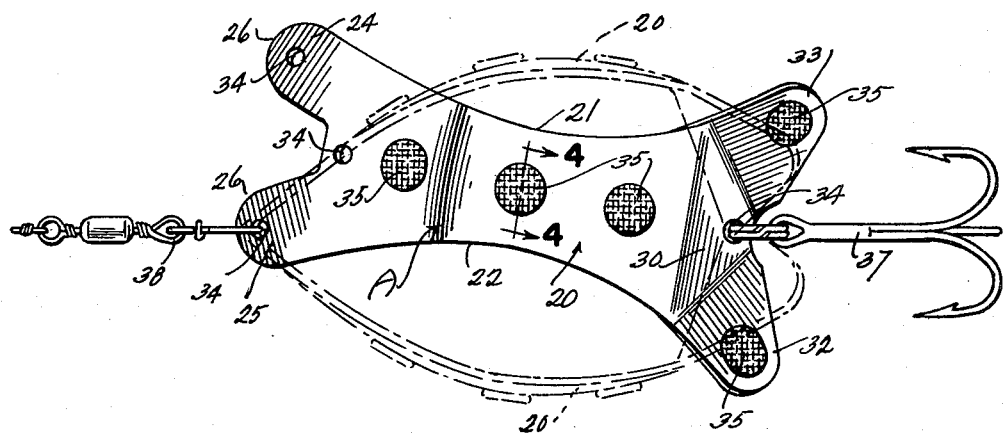
Fig. 1 is a plan view of one of the improved lures, showing how line and hooks may be attached thereto, for the purpose of causing lateral wobble and axial spin.
Figure 2:
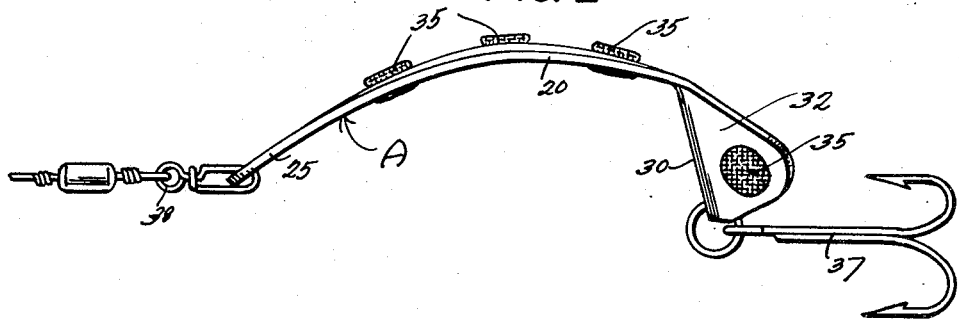
Fig. 2 is a side elevation of the lure of Fig. 1.
Figure 3:
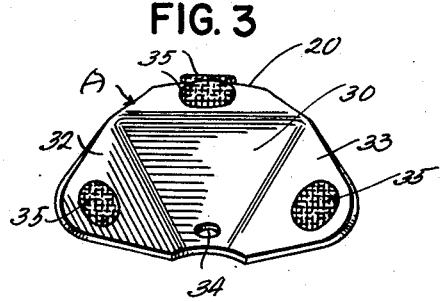
Fig. 3 is an end elevation of the lure of Figs. 1 and 2.

In the drawings, wherein for the purpose of illustration is shown a plurality of forms of the invention, the letters A, B, C and D, may generally designate the lures respectively shown in Figs. 1, 5, 11 and 16 of the drawings.

Figure 4:
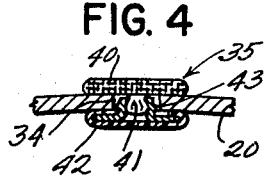
Fig. 4 is a transverse cross sectional view taken substantially on the line 4—4 of Fig. 1, and more particularly showing a removable flash button for the body of the lure.
Figure 5:
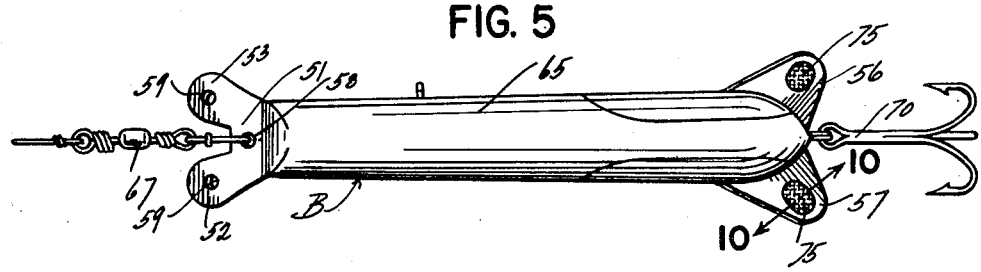
Fig. 5 is a plan view of another form of lure having end blade and finger connecting features of the lure of Figs. 1 to 4 inclusive, but having a different body construction.
Figure 6:
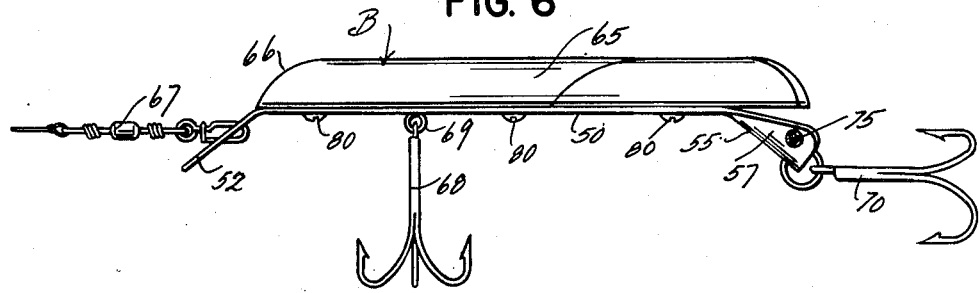
Fig. 6 is a side elevation of the lure of Fig. 5.
Figure 7:
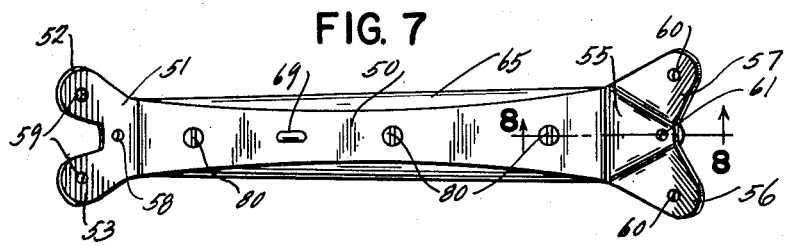
Fig. 7 is a bottom plan view of the lure construction of Figs. 5 and 6.
Figure 8:
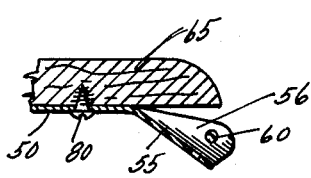
Fig. 8 is a fragmentary cross sectional view taken through the lure of Figs. 5, 6 and 7, substantially on the line 8—8 of Fig. 7.
Figure 9:
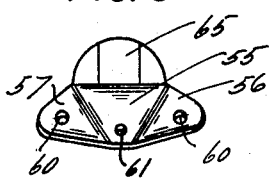
Fig. 9 is an end view of the lure of Figs. 5, 6 and 7.

Referring to the lure A, the same preferably comprises a longitudinally concavo-convexed thin body 20 having concaved side edges 21 and 22. The body portion 20 gradually increases in width from its intermediate portion to both ends thereof, and if desired the body may be slightly transversely concavo-convexed, as shown in the cross sectional view of Fig. 4, at the intermediate portion thereof.

At one end the body 20 is provided with end extensions or fingers 24 and 25 lying in the same general contour or slope as the adjacent body portion. These fingers have outer edges lying flush with the edges 21 and 22 of the body portion with a space between said fingers, as shown in Fig. 1. The outermost end edges 26 of the fingers 24 and 25 are convexed.

At its opposite end the body portion 20 is provided with a central substantially triangular shaped flat flange portion 30 extending acutely downwardly at the concave side of the body portion. The flange 30 at its opposite side is provided with wings or vanes 32 and 33 which are relatively divergent with respect to each other forwardly and laterally. The planes of the wings 32 and 33 are in acute angled relation with respect to the plane of the portion 30. Openings 34 are provided at the tip ends of the fingers 24 and 25 and at spaced distances along the longitudinal axis of the body portion 20, and also at the tip ends of the wings or vanes 32 and 33.

These openings may serve to receive line connecting swivels, or hooks, or contrastingly colored snap type flash buttons 35, in removable relation thereon.

In the drawings showing the form of invention A, the flange portion 30 upon which the wings 33 and 32 are formed, at its lower end between said wings, has the opening 34 provided with a detachable hook 37. Also, the line connected swivel 38 is connected in the opening 34 of the wing 25.

The material of the lure body may be metal or rigid or stiff synthetic resin. Preferably, the body is of color impregnated aluminium or magnesium alloy.

The removable flash buttons 35 each comprise a portion 40 having a stud 41 thereon and an opposite portion 42 with a socket extension 43 for receiving the stud 41 in a detachable relation therein. The portions 41 and 43 may extend through any of the openings 34, and any of the openings 34 in the ends of the body portion and the wings and fingers may receive either hooks or line connecting swivels.

The lure is intended for use as a spinning lure. By means of the application of the line swivel 38 to one or other of the fingers 24 or 25 the lure will, in addition to axial turning movement, have a lateral wobbling movement as it is drawn through the water. In this respect the line of pull will cause the deflecting vanes or blades 32 and 33 to travel eccentrically through the water.

The flash buttons 35 are colored to contrast with the other surface coloring of the lure. The flash button colors may be changed from time to time, to best suit conditions of fishing.

In the form of lure B, shown in Figs. 5 to 10 inclusive, there is preferably provided a flat metal base portion 50 having at one end thereof a downturned deflecting flange 51 provided with relatively divergent fingers 52 and 53 in the same plane as the flange 51. These downturned portions 51, 52 and 53 are in acute angled relation with respect to the plane of the base 50.

At its opposite end the base portion 50 is provided with a triangularly shaped flat acute angled portion 55, having laterally and forwardly extending relatively divergent wings or vanes 56 and 57. The portions 55 is acutely angled with respect to the plane of the base portion 50 and the wings 56 and 57 are relatively divergent extending upwardly from the plane of the portion 55.

A central opening 58 is provided in the flange 51 and the tip ends of fingers 52 and 53 have openings 59 therein. The tip ends of the wings 56 and 57 have openings 60 therein, and the central outer end of the portion 55 has an opening 61 therein. It will be noted that the end constructions of the base portion of the lure B are the same as the end constructions of the lure A.

The metal base 50 has detachably connected on the upper surface thereof a main body 65 of wood or palstic, or metal, the undersurface of which is flat and the side, top and end surfaces of which may be convexed and sloped to simulate the body of a fish or insect. The end surface 66 of the main body 65 slopes convexedly into and flush with the plane of the rear surface of flange 51, and at the opposite end the body portion 65 extends outwardly beyond the end of the base 50 in overhanging relation with respect to the flange 55, so that water currents may eddy between the wings 56 and 57 and the portion 55, and the underside of the forwardly projecting and overhanging end of the body portion 65.

The line connections upon the lure may be made in any of the openings of the fingers 52 and 53 or the wings 56 and 57, or in the openings 58 and 61 if desired. In lure B, the line swivel 67 is connected in the opening 58, centrally between the fingers 52 and 53. The bottom hook 68 may be connected at 69 to the undersurface of the metal base 50. A hook 70 may be connected to the central opening 61. The openings in the fingers 52 and 53 and in the wings 56 and 57 may receive flash buttons 75 having contrasting coloring with respect to the coloring upon the other portions of the lure.

Figure 10:
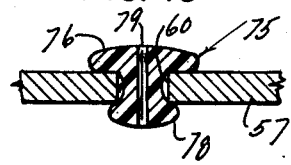
Fig. 10 is an enlarged sectional view taken substantially on the line 10—10 of Fig. 5, and more particularly showing a detachable plastic flash button.
Figure 16:
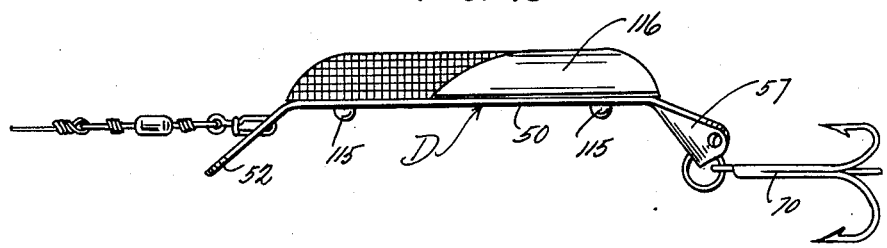
Fig. 16 is a side elevation of an improved type of lure having a detachable plastic body.
Figure 17:
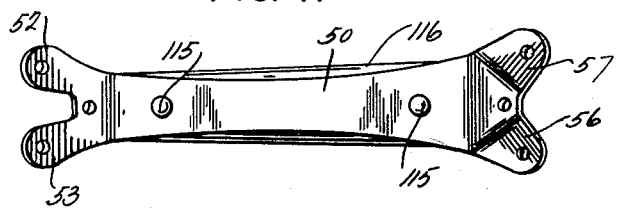
Fig. 17 is a bottom plan view of the lure of Fig. 16.
Figure 18:
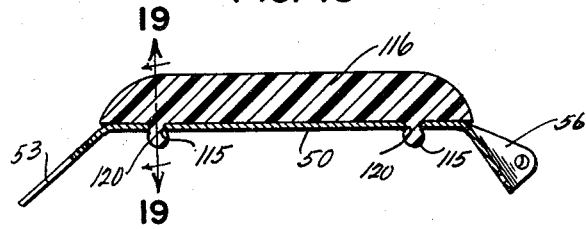
Fig. 18 is a longitudinal cross sectional view taken substantially through the lure of Figs. 16 and 17.

The flash buttons 75, in the form of invention B is preferably made of some flexible rubbery, synthetic resin or plastic material, having a large body button portion 76 and a compressible headed stud 78 adapted to be snapped through the opening 60, as shown in Fig. 10. To facilitate compression the button 75 may have a passageway 79 therethrough.

As is shown in the drawings, the body portion 65 may be attached to the metal base 50 by means of screws 80.

Referring to the form of lure C, shown in Figs. 11 to 15 in the drawings, the same is of a float type, including a longitudinally concavo-convexed metal base 81 of thin gauged material. The upper concave surface 81$^a$ receives in socketed relation thereupon a float 82 which may be of wood and is attached by screw 83 to the base 81. The base side edges 84, shown in dotted lines in Fig. 11, are concavely curved.

The body portion 82 may have convexed or bulging surfaces both longitudinally and transversely, as shown. The end construction of the fingers and vanes upon the base 81 are similar to those of the forms of lures A and B above described. At one end of the base 81 there is a flange portion 85 downturned at an acute angle with respect to the adjacent portion of the base 81 and in the same plane the flange 81 has the relatively divergent fingers 86 and 87 thereupon. The general plane of the upper surfacing portion 85, 86 and 87 lies flush with the adjacent surfacing or slope of the end of float 82, as shown in Fig. 12.

At its opposite end the base plate 81 is provided with a substantially triangular flange central portion 90, the angle of which is acute with respect to the adjacent part of the base 81. At its sides the flange 90 is provided with the laterally and forwardly extending divergent fingers 91 and 92. Openings 93 are provided in the central portion of the flange 85 and the tip ends of the fingers 86 and 87, and at the lower portion of the flange 90 and the outer ends of the blades or vanes 91 and 92, for the purpose of receiving hooks, lines or flash buttons.

A hook 94 is shown attached in the flange 90 centrally thereof. A passageway providing crimp portion 95 may be provided upon the underside of the base 81, as shown in Figs. 12 and 13 for receiving a hook 97.

The base plate 81 at its rear adjacent to the flange 85 may be transversely crimped, at 100 to provide a passageway 101 adapted to receive a gang hook, shown in Figs. 13 and 14. The gang hook construction may include a rod portion 102 loosely extending through the passageway 101, the same intermediate its ends being doubled or provided with a lateral projection 103 adapted to loosely extend through a transverse opening 104, provided midway between the ends of the crimp 100, in order to limit rotation of the rod 102. The hook supporting rod 102 at its ends may support hooks 107 and 108 at each side of the lure.

Any of the openings at the ends of the lure may receive line connections or hook connections. The removable flash buttons 10 may be similar to the flash buttons 35 above described for the lure A; the same including head portions and detachable snap extensions which will facilitate attachment to the fingers, vanes, and other parts of the lure, so that the color of the buttons may be adapted to fishing conditions.

It will be noted that the float construction of the lure C is substantially different from that shown in our U. S. Patent 2,673,417, dated March 30, 1954, as therein shown in Fig. 7, in that the end constructions are downturned with respect to the adjacent portions of the plate upon which connected so that the float of the lure faces upwardly instead of downwardly.

Figure 19:
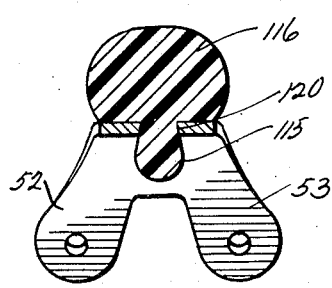
Fig. 19 is a transverse cross sectional view taken substantially on the line 19—19 of Fig. 18, showing the mode of attachment of the plastic body to the lure metal base.

Referring to the lure construction D, as shown in Figs. 16 to 19 inclusive, the shape of the metal base and end structure of this lure is the same as that of the lure B and the same reference characters as have been given to and described in connection with the lure B have also been applied to lure D. The base portion 50 of the lure D, however, has transverse openings 120 therein adapted to serve as means for detachably connecting the main body portion 116 to the base plate 50. The body portion 116 may be elongated with the end thereof sloped to surface conform flush with the surfacing at the ends of the base plate flanges, and the body portion 116 may have convex outer surfacing. Its lower surface is normally flat as shown in Fig. 19. The body portion 116 is preferably provided with compressible and flexible studs 115 adapted to removably seat in the openings 120 for attachment of the body portion 116 upon the base plate 50.

The body portion 116 and the studs 120 are preferably formed of some plastic material, such as a synthetic resin, and the entire body portion may be flexible or it may be rigid and only the studs 120 compressible. It may be shaped and colored as desired.

The advantage in making the body 116 removable is that differently colored and differently designed bodies may be applied upon the plate 50 to suit the fishing conditions.

It will be noted that each of the forms of invention A, B, C and D have the same end structures for the lures. The fact that central openings are provided in one end construction of the lure between the divergent fingers insures that the line swivel connection will have a pivotal action rearwardly of the tip ends of the fingers, as will be noted from the lures shown in Figs. 5 and 16. The location of the divergent vanes, at the opposite end of the body portion of each of the lures, attached to a triangular shaped flange gives a very sensitive and vigorous action to the lure when drawn through the water. The flash button openings on the vanes are spaced apart (on each lure) a greater distance than the maximum width of the body portion. This enables fish to see the flash buttons from all directions.

Various changes in the shape, size and arrangement of parts may be made to the forms of invention shown and described, without departing from the spirit of the invention or scope of the claims.

We claim:

1. A fishing lure comprising a base portion of thin gauged material having at one extreme end a pair of fingers extending beyond said end outwardly and divergently from said base in the general direction of the longitudinal axis thereof, and at the other end thereof having an acute angled down-turned flange provided with laterally divergent vanes, said vanes extending outwardly beyond said base and flange in the general direction of said longitudinal axis, said fingers, flange and vanes being of the same thin gauge as the base portion and said divergent fingers and vanes at the outer ends thereof each having a transverse opening therein adapted for selective attachment thereto of additional lure elements.

2. A fishing lure as described in claim 1 in which the additional lure elements consist of flash buttons detachably connected in the openings of said vanes, each flash button comprising a pair of button portions, one of which has a socket therein and the other of which has a head for seating in said socket, said socket and head being of the snap "lift the dot" type for connection in the openings of the vanes with the button portions of each flash button respectively disposed at opposite sides of its respective vane.

3. A fishing lure comprising an elongated narrow thin gauged base having at the forward end thereof a pair of thin gauged fingers extending beyond said end outwardly and divergently from said base in the general direction of the longitudinal axis thereof, said base at the rear end thereof having an acute angled flange connected to the base and extending downwardly therefrom, a pair of deflecting vanes connected to the opposite side edges of said flange and extending outwardly beyond said base and flange in the general direction of said longitudinal axis, and an elongated body connected on top of said base.

4. A fishing lure comprising an elongated flat base with relatively divergent fingers extending below one side and endwise from one end thereof and in acute angled relation with respect to the plane of said base, a down-turned flange extending from said base at the opposite end thereof, said downturned flange being provided on opposite sides with upwardly and laterally extending divergent deflecting vanes which are disposed in acute angled relation with respect to the plane of the base, said vanes being located at the same side of the base as said fingers, and a main lure body mounted upon said base at the side thereof opposite said one side, said body extending outwardly beyond the end of the base upon which the vanes are disposed and being spaced in overhanging relation to said flange and said endwise extending divergent deflecting vanes.

5. A fishing lure comprising a base portion of thin gauged material having at one extreme end a pair of fingers extending beyond said end outwardly and divergently from said base in the general direction of the longitudinal axis thereof, said base at the other end thereof having an acute angled downturned flange provided with laterally divergent vanes, said vanes extending outwardly beyond said base and flange in the general direction of said longitudinal axis, said fingers, flange and vanes being of the same thin gauge as the base portion, said divergent fingers and vanes at the outer ends thereof each having a transverse opening therein adapted for selective attachment thereto of additional lure elements, said base having a transverse opening therein, and a flash button detachably connected in said opening comprising a pair of button portions, one portion having a socket therein, and the other portion having a head, said socket and head being of the snap "lift-the-dot" type for connection of the button portions through the opening of the base with the button portions of each button having a major portion disposed at opposite sides of said base.

6. A fishing lure comprising a body portion, an integral substantially triangular shaped flange extending from one end of said body portion and disposed in acute angled relation thereto, said flange having the sides thereof converging endwise, said sides having integrally attached thereto vanes which are both forwardly and laterally divergent away from said end of the body portion and which are inclined in planes divergent from one surface of the body portion in the direction of the opposite surface, said vanes at the outer ends thereof being provided with transverse openings which are spaced farther apart from center to center than the maximum width of the body portion, and means for connecting hooks and a line to said lure.

7. A lure as described in claim 6 in which detachable flash buttons are disposed in the openings of said vanes.

References Cited in the file of this patent

UNITED STATES PATENTS

| Number | Name | Date |
|---|---|---|
| 1,239,956 | Phinney | Sept. 11, 1917 |
| 1,332,112 | Duhamel | Feb. 24, 1920 |
| 1,477,864 | Bolton | Dec. 18, 1923 |
| 1,847,397 | Hofschneider | Mar. 1, 1932 |
| 1,866,465 | Harrington et al. | July 5, 1932 |
| 1,981,091 | Clark | Nov. 20, 1934 |
| 2,512,914 | Boice | June 27, 1950 |
| 2,538,703 | Perry | Jan. 16, 1951 |
| 2,598,360 | Cummins | May 27, 1952 |
| 2,618,096 | Wagner | Nov. 18, 1952 |
| 2,650,450 | Grathwohl | Sept. 1, 1953 |